INVENTORS.
DAVID L. BAHRS
JOHN F. COULEUR
PHILIP F. GUDENSCHWAGER
RICHARD L. RUTH
WILLIAM A. SHELLY
JOHN W. WEIL
BY

ATTORNEY

United States Patent Office 3,454,933

Patented July 8, 1969

3,454,933

DATA PROCESSING SYSTEM

David L. Bahrs, Liverpool, N.Y., and John F. Couleur, Phoenix, Philip F. Gudenschwager, Scottsdale, and Richard L. Ruth, William A. Shelly, and John W. Weil, Phoenix, Ariz., assignors to General Electric Company, a corporation of New York Filed June 27, 1966, Ser. No. 560,684

Int. Cl. G11b *13/00;* G06f *1/00, 7/00*

U.S. Cl. 340—172.5 8 Claims

ABSTRACT OF THE DISCLOSURE

A data processing system including a data processor and a memory unit is shown. The processor includes a means for providing several different types of addresses modifications.

Figure 1:
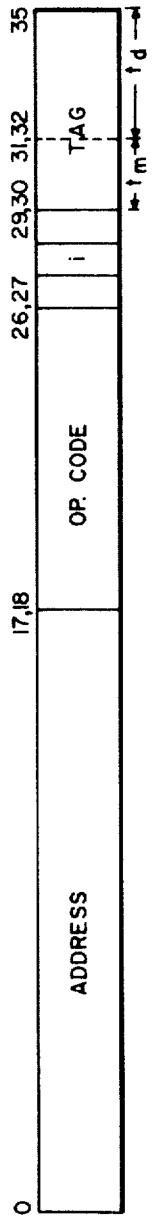

This invention relates generally to data processing systems and, more particuarly, to means for providing memory addresses in a data processing system.

In a data processing system which executes a sequence of instruction words called a program to process data, it is often described to provide the capability of what is generally referred to as indirect addressing. More correctly, it is desirable to provide for address modification which includes indirect addressing. In address modification the address portion of an instruction word is not usually the address utilized to obtain the information item (operand) from a memory unit which is to be acted upon by a data processing unit.

Address modification permits versatility and flexibility is establishing programs for a date processing system and greatly eases the problems of the programmer. Address modification also facilitates the use of certain fundamental concepts by more than one programmer without the inelusion of a great number of details in each of the programs. Without address modification it is necessary for the programmer to use what is sometimes termed an impure procedure. In an impure procedure, the programmer must modify each instruction used. This prohibits, in a multiprocessor system, the use of a single instruction by more than one program. Thus, an impure procedure does not represent an efficient method of programming. Additionally, by address modification a particular memory location may be preselected which will serve to point to a particular type of function. With this knowledge the programmer may proceed to write his program knowing that when he needs this particular type of function he need only reference this preselected location.

While address modification is fairly well deveoped in the art it has suffered from lack of versatility in the number of ways of developing addresses. Accordingly, it is desirable to extend the usefulness of address modification in a data processing system.

It is, therefore, an object of the present invention to provide an improved address modification apparatus in a data processing system.

It is another object of the invention to extend the address, modification capability of a data processing system.

It is a still further object to provide a data processing system embodying new and improved means for address development.

Still another object is to provide a data processing system employing address modification apparatus to ensure greater versatility to the program.

It is a still further object of the present invention to provide a data processing system employing address modification apparatus which permits the programmer to place a prescribed designation in any instruction word which will cause the system to enter a special routine regardless of the rest of the contents of the instruction word.

The foregoing objects are achieved, in accordance with the illustrated embodiment of the present invention by providing an instruction word which includes a tag portion defining the type of address modification. Decoding means are provided for decoding this tag portion and for providing a designated output for each of several bit configurations of the tag portion. One of the outputs of the decoding means results in activating portions of the data processing unit which, in turn, cause the system to enter a specific routine without regard to the contents of the remaining portion of the instruction word. Thus, it is possible for the programmer to tarnsfer the operation of the system from its normal program to a specified routine merely by varying the tag portion of an instruction word.

*Drawings*

Figure 2:
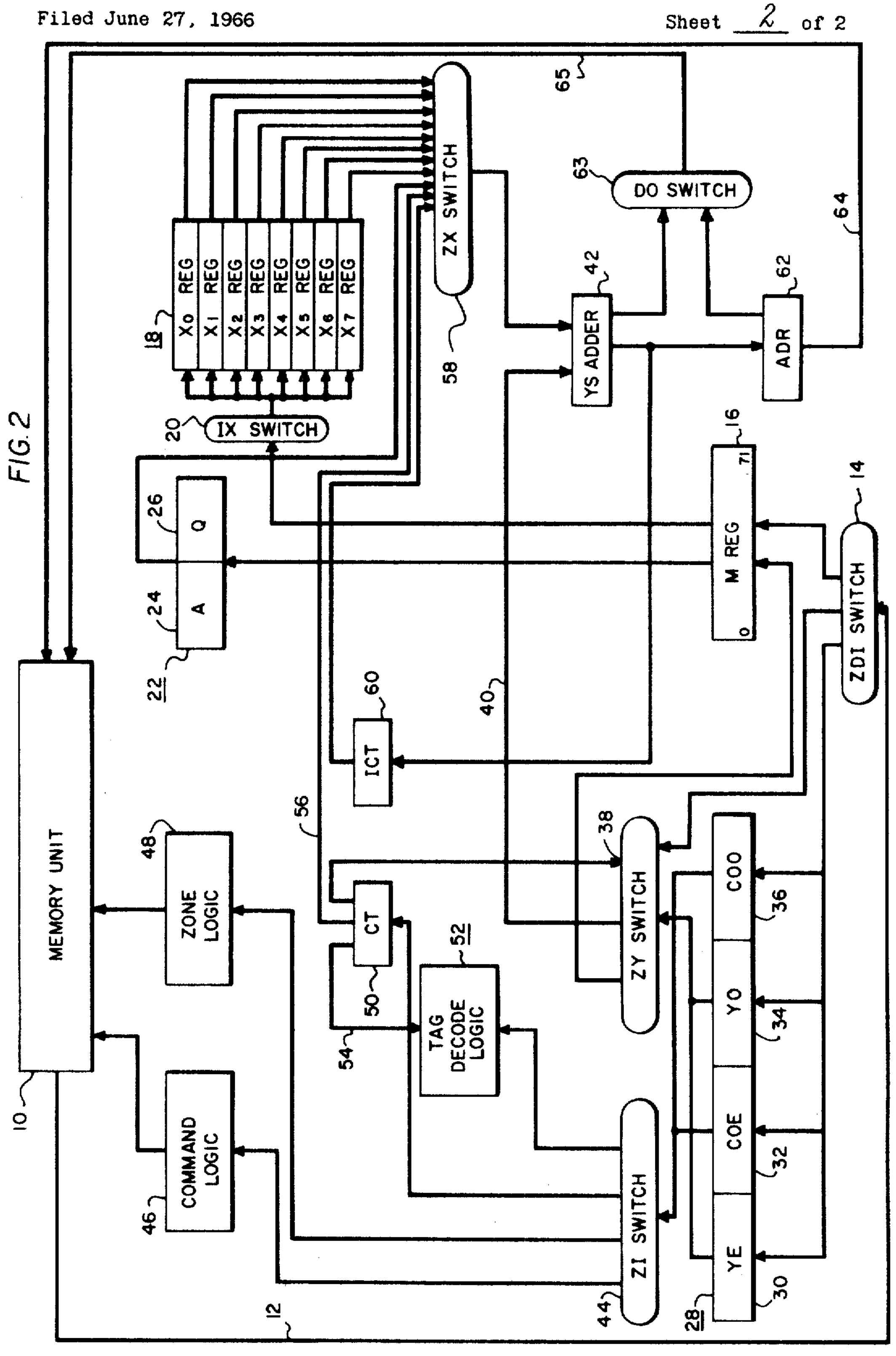

For a better understanding of the invention, reference is made to the accompanying drawings in which:

FIGURE 1 illustrates the format of a typical instruction word used in the present invention; and FIGURE 2 is a major block diagram illustrating the data paths in the system of the present invention.

For a complete description of the system illustrated in FIGURES 1 and 2 and of our invention, reference is made to United States Patent No. 3,425,039, issued to David L. Bahrs et al. on Jan. 28, 1969, and assigned to the assignee of the present invention. More particularly, attention is directed to FIGURES 3 through 20 and to the specification beginning at column 2, line 42 and ending at column 25, line 56, inclusive, of United States Patent No. 3,425,039 which are incorporated herein by reference and made a part hereof ts if fully set forth herein.

What is claimed is:

1. A data processing system comprising: a data processing unit; a memory unit having a plurality of selectively addressable storage locations each containing an information item, certain of said information items comprising instruction words each including a tag portion; means for bringing an instruction word from said memory unit to said data processing unit; means responsive to the tag portion of said instruction word for developing a prescribed instruction word having an adress portion and an operation code portion; and means responsive to said prescribed instruction word for bringing an information item from said memory unit to said data processing unit from the storage location specified by the address portion of said prescribed instruction word.

2. A data processing system comprising: a data processing unit; a memory unit having a plurality of selectively addressable storage locations each containing an information item, certain of said information items comprising instructions words, each of said instruction words including a tag portion; means for bringing an instruction word from said memory unit to said data processing unit; decoding means for decoding said tag portion of said instruction word and for providing an output signal in response thereto; means responsive to said output signal of said decoding means for developing a prescribed instruction word having an address portion and an operation code portion; and means responsive to said prescribed instruction word for the bringing of an information item from said memory unit to said data processing unit from the storage location specified by the address portion of said prescribed instruction word.

3. In a data processing system, the combination comprising: a memory unit having a plurality of selectively addressable storage locations each containing an information item, certain of said information items comprising instruction words each of which includes a tag portion; a data processing unit for acting upon selected ones of said information items; means for bringing an instruction word from said memory unit to said data processing unit; decoding means within said data processing unit for decoding said tag portion of said instruction word and for providing an output signal in response thereto; means responsive to said output signal of said decoding means for developing a prescribed instruction word having an address portion, specifying one of said addressable storage locations, and an operation code portion; and means responsive to said prescribed instruction word for bringing a pair of information items from said memory unit to said data processing unit from the storage location specified by the address portion of said prescribed instruction word and from a storage location immediately adjacent therto.

4. A data processing system comprising: a data processing unit; a memory unit having a plurality of selectively addressable storage locations each containing an information item, certain of said information items comprising instruction words each including a tag portion; means for bringing an instruction word from said memory unit to said data processing unit; means for decoding said tag portion of said instruction word and for providing an output signal in response thereto; encoding means responsive to said output signal for developing a portion of a specific storage location address; additional means responsive to said output signal for developing the remainder of said specific storage location address and for developing an operation code portion of an instruction word; and means responsive to said specific storage location address and to said operation code portion to provide a subsequent accessing of said memory unit to bring the information item stored in the location defined by said specific address to said data processing unit.

5. A data processing system comprising: a data processing unit; a memory unit having a plurality of addressable storage locations each containing an information item, certain of said information items comprising an instruction word including an operation code portion and a tag portion; means for bringing an instruction word from said memory unit to said data processing unit; means for decoding said tag portion of said instruction word and for providing an output signal in response thereto; encoding means responsive to said signal for developing a first address portion; selectively variable switch means for developing a second address portion in response to said output signal, said first and second address portions collectively defining a specific storage location address within said memory unit; additional means responsive to said output signal for providing an operation code portion of an instruction word; and means responsive to said specific storage location address and to said operation code portion to effect a subsequent accessing of said memory unit for the bringing of an information item to said data processing unit.

6. A data processing system comprising: a data processing unit; a memory unit having a plurality of addressable storage locations each containing an information item, certain of said information items comprising an instruction word including an operation code portion and a tag portion; means for bringing an instruction word from said memory unit to said data processing unit; decoding means responsive to said tag portion for developing an output signal designating the contents of said tag portion; means for storing said output signal of said decoding means; encoding means responsive to the stored signal of said decoding means for developing a first address portion; selectively variable switch means for developing a second address portion in response to said stored signal, said first and second address portions collectively defining a specific storage location address within said memory unit; additional means responsive to said output signal for providing an operation code portion of an instruction word; and means responsive to said specific storage location address and to said latter operation code portion to effect a subsequent accessing of said memory unit for the bringing of an information item to said data processing unit.

7. In a data processing system of the type comprising a memory unit having a plurality of addressable storage locations each containing an information item, a data processing unit for acting upon selected ones of said information items and means interconnecting said memory unit and said data processing unit whereby said information items can be transferred therebetween, the improvement comprising: certain of said information items comprising instruction words each including a tag portion; means for bringing an instruction word from said memory unit to said data processing unit; decoding means within said data processing unit for decoding said tag portion of said instruction word and for providing an output signal in response to said tag portion; means responsive to said output signal of said decoding means for developing a prescribed instruction word having an address portion, specifying one of said addressable storage locations, and an operation code portion; and means responsive to said prescribed instruction word for bringing an information item from said memory unit to said data processing unit from the storage location specified by the address portion of said prescribed instruction word.

8. In a data processing system of the type including a memory unit having a plurality of selectively addressable storage locations each containing an information item, a data processing unit for acting upon selected ones of said information items and means interconnecting said memory unit and said data processing unit whereby said information items can be transferred therebetween, the improvement comprising: certain of said information items comprising instruction words each including a tag portion; means for bringing an instruction word from said memory unit to said data processing unit; means for decoding said tag portion of said instruction word and for providing an output signal in response thereto; encoding means responsive to said output signal for developing a portion of a specific storage location address; additional means responsive to said output signal for developing the remainder of said specific storage location address and for developing an operation code portion of an instruction word; and means responsive to said specific storage location address and to said operation code portion to provide a subsequent accessing of said memory unit to bring the information item stored in the location defined by said specific address to said data processing unit.

References Cited

UNITED STATES PATENTS

| | | | |
|---|---|---|---|
| 3,036,773 | 5/1962 | Brown | 235—157 |
| 3,201,761 | 8/1965 | Schmitt et al. | 340—172.5 |
| 3,222,649 | 12/1965 | King et al. | 340—172.5 |

PAUL J. HENON, *Primary Examiner.*

RAULFE B. ZACHE, *Assistant Examiner.*